US007814482B2

(12) United States Patent
Kwon et al.

(10) Patent No.: US 7,814,482 B2
(45) Date of Patent: Oct. 12, 2010

(54) SYSTEM AND METHOD FOR GRID MPI JOB ALLOCATION USING FILE-BASED MPI INITIALIZATION IN GRID COMPUTING SYSTEM

(75) Inventors: Oh Kyong Kwon, Daejeon (KR); Jae Gyoon Hahm, Daejeon (KR); Sang Wan Kim, Daejeon (KR); Jong Suk Lee, Daejeon (KR); Hyung Woo Park, Daejeon (KR); Kyung Lang Park, Seoul (KR); Shin Dug Kim, Goyang (KR); Kwang Won Koh, Gimpo (KR)

(73) Assignee: Korea Institute of Science & Technology Information, Daejeon (KR)

( * ) Notice: Subject to any disclaimer, the term of this patent is extended or adjusted under 35 U.S.C. 154(b) by 1322 days.

(21) Appl. No.: 11/044,557

(22) Filed: Jan. 27, 2005

(65) Prior Publication Data

US 2005/0198104 A1 Sep. 8, 2005

(30) Foreign Application Priority Data

Jan. 29, 2004 (KR) ...................... 10-2004-0005818

(51) Int. Cl.
*G06F 9/445* (2006.01)
*G06F 15/177* (2006.01)
*G06F 15/16* (2006.01)

(52) U.S. Cl. ........................ 717/176; 709/222; 709/228

(58) Field of Classification Search .................. 717/176; 709/222, 228

See application file for complete search history.

(56) References Cited

U.S. PATENT DOCUMENTS

| 7,555,549 B1 * | 6/2009 | Campbell et al. ............ 709/224 |
| 2002/0112232 A1 * | 8/2002 | Ream et al. .................. 717/176 |
| 2006/0048098 A1 * | 3/2006 | Gatlin et al. ................. 717/124 |

OTHER PUBLICATIONS

Sistare, S.; Test, J.; Plauger, D.; Cluster Computing, 2002. Proceedings. 2002 IEEE International Conference on; Digital Object Identifier: 10.1109/CLUSTR.2002.1137769; Publication Year: 2002, pp. 370-377.*

* cited by examiner

*Primary Examiner*—James Rutten
(74) *Attorney, Agent, or Firm*—LRK Patent Law Firm

(57) ABSTRACT

A file-based Message Passing Interface (MPI) job allocation apparatus for a middleware-based grid computing apparatus in which computers having a plurality of computing resources including an MPI program are distributed and connected to each other through a network, includes: a plurality of computational nodes each having a job execution service module for executing a job for the plurality of computing resources including the MPI program included in the distributed computers; and a middleware having a job submission service module for distributing a job to the plurality of computational nodes, receiving information necessary for MPI initialization, generating a file including the information, and transmitting the file to the MPI program.

10 Claims, 4 Drawing Sheets

```
                    RANK_IN_MY_SUBJOB
                         MY_SUBJOB_SIZE    UNIQUE VALUE FOR COMMWORLD_ID
                            MPID_MYWORLDSIZE
                               NSUBJOBS                BARRIER_PORT    FRONT NODE'S HOSTNAME
                                  MPI PROCESS LISTEN PORT      HOSTNAME 0  2  4  2  33501  9292  36000  dccsaturn              dccsun.sogang.ac.kr
            1  2  4  2  33501  9292  36000  dccneptune             dccsun.sogang.ac.kr
            0  2  4  2  33501  9292  36000  cluster203.yonsei.ac.kr  cluster203.yonsei.ac.kr
            1  2  4  2  33501  9292  36000  cluster202.yonsei.ac.kr  cluster202.yonsei.ac.kr
            1  0  dccsaturn              33501  12 LAN_ID_foo 0  dccsun.sogang.ac.kr
            1  0  dccneptune             33501  12 LAN_ID_foo 0  dccsun.sogang.ac.kr
            1  0  cluster203.yonsei.ac.kr  33501  12 LAN_ID_foo 1  cluster203.yonsei.ac.kr
            1  0  cluster202.yonsei.ac.kr  33501  12 LAN_ID_foo 1  cluster202.yonsei.ac.kr S_TCPTYPE              PORT        LAN_ID       FRONT NODE'S HOSTNAME
        S_N PROTOS      HOSTNAME          LAN_ID_LENGTH
                                                   LOCALHOST_ID
```

FIG. 4

SYSTEM AND METHOD FOR GRID MPI JOB ALLOCATION USING FILE-BASED MPI INITIALIZATION IN GRID COMPUTING SYSTEM

BACKGROUND OF THE INVENTION

1. Field of the Invention

The present invention relates to a system and method for executing an MPI in a grid computing system, and more particularly to file-based grid MPI job allocation system and method for a grid computing system in which computers are distributed and connected to each other through a network as computational nodes, wherein the grid MPI job allocation system differentiates functions of a middleware and the MPI program, thereby achieving MPI initialization without intervention of a separate arbitration process.

2. Description of the Prior Art

As generally known in the art, grid computing is a technology for effectively constructing a high-performance infra environment by integrating various kinds of computing resources connected through a network. A grid computing environment constructed based on such a technology as described above shows difference from the current internet environment in many aspects. The grid computing environment allows sharing of various kinds of computing resources as well as sharing of the simple information basically provided by the internet environment. In the actual grid environment, it is natural that a user can simultaneously use various available resources.

Currently, researches for the grid computing are being actively conducted worldwide and tools for supporting the grid environment based on a configuration called 'Open Grid Services Architecture (OGSA)' are being developed with reference to existing web service models. The term 'OGSA' indicates a specification for a configuration of grid services which can be linked with each other. The OGSA has been achieved by revising the existing web service models while mainly focusing on the characteristics required by the grid construction and applications and is now recognized as a new configuration of a middleware for grid computing. The application of the grid computing has used up to now the Globus toolkit which is a standard middleware in the art and has been developed up to the Globus toolkit version 3.0 based on the OGSA.

In a framework based on the OGSA as described above, all functional elements are expressed as grid services, and a state of each of the grid services is expressed by a standardized method, i.e., by a service data.

The Message Passing Interface (MPI) is a standard interface, which enables application scientists to execute a parallel program in a high-performance computer and is a parallel-processing library based on message transfer technique. All processes participating in an MPI parallel program can perform particular programs by exchanging messages with each other with their own IDs (or ranks). Therefore, each of the processes must first understand its own role (rank), the entire configuration, and a location of a counterpart in the entire program. This job is performed by MPI_Init function, and the MPI application can be performed only after the MPI_Init process. Current scientists are expected to prefer to do the job using the existing MPI code already made rather than to make an application program by means of a new interface in a grid environment.

Meanwhile, currently known Application Program Interfaces (APIs) for performing jobs using an MPI code in a grid environment include MPICH-G2 and MPICH-P4. Both the MPICH-G2 and the MPICH-P4 have a central type initialization scheme, in which an intermediary process is located at the center and must continuously perform the intermediation in the exchange of information between processes. Therefore, when the location of the intermediary process has a large influence on the performance, the reliability on the middleware may become very large according to the types of the intermediary processes.

That is to say, in order to enable the MPI communication in another cluster environment, the existing Globus toolkit 2.x uses an API named DUROC (Dynamically-Updated Request Online coallocator). When the MPI job is initialized using the DUROC API as the MPICH-G2 as an example of materialized MPIs available in the Globus toolkit 2.x, the MPI allocation for resources is performed through the DUROC API and the MPI processes in each resource exchanges information required for the initialization.

More specifically, as shown in FIG. 1, the MPICH-G2 is an enlarged version of the MPICH for the grid, which has been made by the Argonne National Laboratory (ANL). The MPICH-G2 utilizes the functions of the Globus toolkit in all the steps in the process of executing the MPI, such as disclosure of the Globus toolkit job, communication, etc.

In other words, the MPI initialization in the MPICH-G2 is a centralized initialization using the DUROC. Referring to FIG. 1, the DUROC is contained in the programs named 'globusrun' and 'globus-job-manager'. The golobusrun manages works of computers distributed in the network and connected to the center through the network and helps message transmission between the computers in the MPI initialization. Therefore, the initialization of the process has a large reliability on the component of DUROC, and the centralized initialization forces the center to understand all necessary information of the network for the management.

Further, when using the MPICH-P4 which is a basic library of the MPICH, a library performing the MPI function through a communication module of P4, the user uses the mpicc for the compiling and uses the mpirun program for the start. In the MPICH-P4, a single repetitive process is generated for initialization and is used to produce other processes. When the mpirun is called, the mpirun generates an environment parameter file named 'PIXXX' and generates a signal a.out process. Herein, although the a.out is an execution program compiled by the user, the a.out executed first is also used as a start program for generating another process. The PIXXX file enables the a.out to understand the location at which another process must be positioned, and the a.out generates the location by means of rsh. When the process is generated using the rsh, the rank of each process and the address of the master are simultaneously given, and the slave nodes exchanges their information by communicating with a master node.

In the MPICH-P4 as described above, the master process of the user perform the arbitration, while the computing processes communicate with the master process in order to understand positional information of other processes. Therefore, the MPICH-P4 inevitably has reliability on the middleware because it is a centralized type, although the reliability is low.

The MPI job allocation system and method such as the MPICH-G2 and MPICH-P4, in which communication is performed based on an arbitration process such as DUROC API, are dependent system and method, in which the API corresponding to the arbitration process must be remade when the grid middleware changes. Accordingly, whenever the standard for the middleware changes, it is indispensable to develop again a new API corresponding to a new arbitration process.

Therefore, there has been a strong request for MPI job allocation system and method capable of executing the MPI in a multiple cluster environment, which is an actual grid environment, independently from a middleware, by employing a different scheme from the MPICH-G2 or MPICH-P4, even without the DUROC API which enables communication with an MPI process in another resource, such as Globus toolkit 3.0 which is a current standard in the art.

SUMMARY OF THE INVENTION

Accordingly, the present invention has been made to solve the above-mentioned problems occurring in the prior art, and an object of the present invention is to provide a system and a method for MPI job allocation, which can achieve MPI initialization without a separate arbitration process by differentiating functions of the middleware and the MPI program from each other in the grid computing environment. The system includes an apparatus and a computer readable medium as well as a software for the MPI job allocation.

It is another object of the present invention to provide a system and a method for MPI job allocation, which can easily achieve MPI initialization for grid job even with a middleware configuration without a separate process participating in the MPI initialization, such as Globus toolkit 3.0.

It is another object of the present invention to provide a system and a method for MPI job allocation using a file-based MPI initialization, which can be easily applied to any type of grid middleware.

In order to accomplish this object, there is provided a file-based grid MPI job allocation system for a middleware-based grid computing system in which computers having a plurality of resources including an MPI program are distributed and connected to each other through a network, wherein the grid MPI job allocation system differentiates functions of a middleware and the MPI program, thereby achieving MPI initialization without intervention of a separate arbitration process.

The file-based grid MPI job allocation system comprises: a plurality of nodes each having a job execution service module for executing job for the plurality of resources including the MPI program included in the distributed computers; and a middleware having a job submission service module for distributing job to the plurality of nodes, receiving information necessary for the MPI initialization, generating a file including the information, and transmitting the file to the MPI program.

The file transmitted from the middleware includes addresses and port numbers of the plurality of nodes.

In accordance with another aspect of the present invention, there is provided a file-based grid MPI job allocation method in a middleware-based grid computing system in which computers having a plurality of resources including an MPI program are distributed and connected to each other through a network, the file-based grid MPI job allocation method comprising the steps of: (1) transmitting information necessary for MPI initialization from a plurality of nodes to a job submission service module of a middleware, the plurality of nodes being formed by intersection of lines connecting the plurality of resources to each other; (2) generating a file containing the information and transmitting the file to the plurality of the nodes by the job submission service module; (3) initializing the MPI program by using the information of the file; and (4) performing MPI job by the plurality of resources.

Preferably, step (1) comprises the steps of: distributing job to the plurality of nodes by the job submission service module; executing a job manager by the plurality of nodes; recognizing information necessary for the MPI initialization, the information including specific addresses and port numbers of lower-layer resources, which are recognized by the execution of the job manager; and transmitting the recognized addresses to the job submission service module.

More preferably, step (2) comprises the steps of: generating a file by formatting the information in a specific form by the job submission service module, the information being necessary for the MPI initialization transmitted from the and being transmitted from the plurality of nodes; and transmitting the file formatted in the specific form to the plurality of nodes.

It is also preferred that the file is formatted in the specific form such that rank in one's subjob, size of one's subjob, total size of MPI job, number of subjob, listening port of MPI process, kinds of used protocol, type of used protocol, hostname of computational node running each a MPI process, listening port of MPI process, and identification that node is on the designated LAN can be recognized.

BRIEF DESCRIPTION OF THE DRAWINGS

The above and other objects, features and advantages of the present invention will be more apparent from the following detailed description taken in conjunction with the accompanying drawings, in which:

FIG. 4 is a view of a file configuration, which shows an example of a file format to be provided for the MPI initialization in FIG. 3.

DETAILED DESCRIPTION OF THE PREFERRED EMBODIMENTS

Hereinafter, the present invention will be described in detail with reference to the accompanying drawings. The present invention discloses a system and a method for MPI job allocation using a file-based MPI initialization, thereby allocating the MPI job independently from the components of the middleware.

Figure 1:
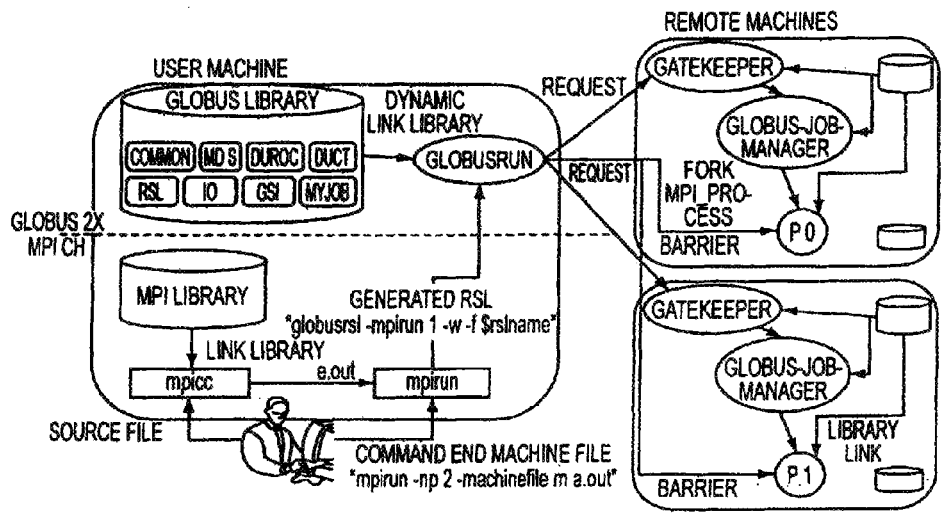
FIG. 1 is a schematic view of a drive mechanism performing the MPI job while relying on the middleware in MPICH-G2.
Figure 2:
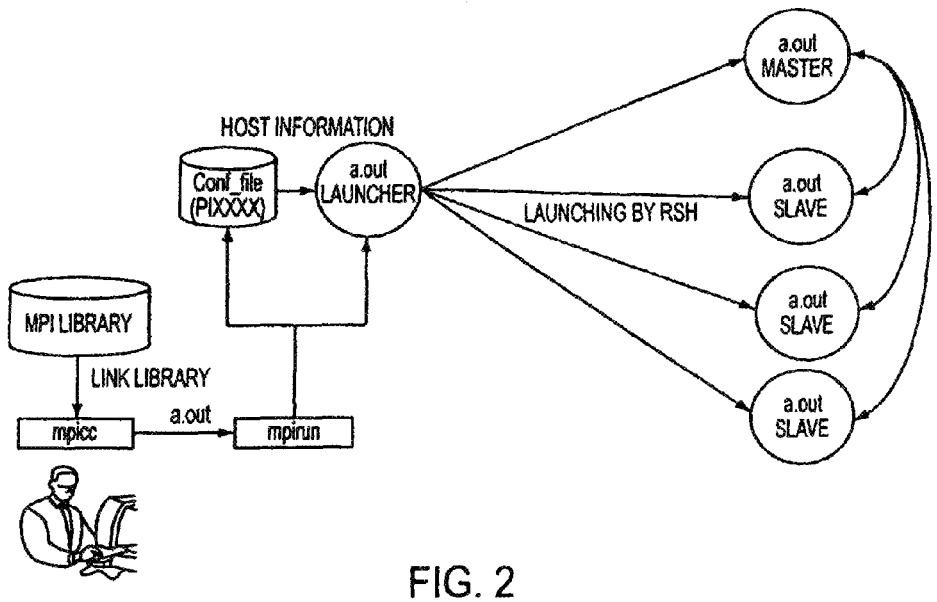
FIG. 2 is a schematic view of a drive mechanism performing the MPI job while relying on the middleware in MPICH-P4.
Figure 3:
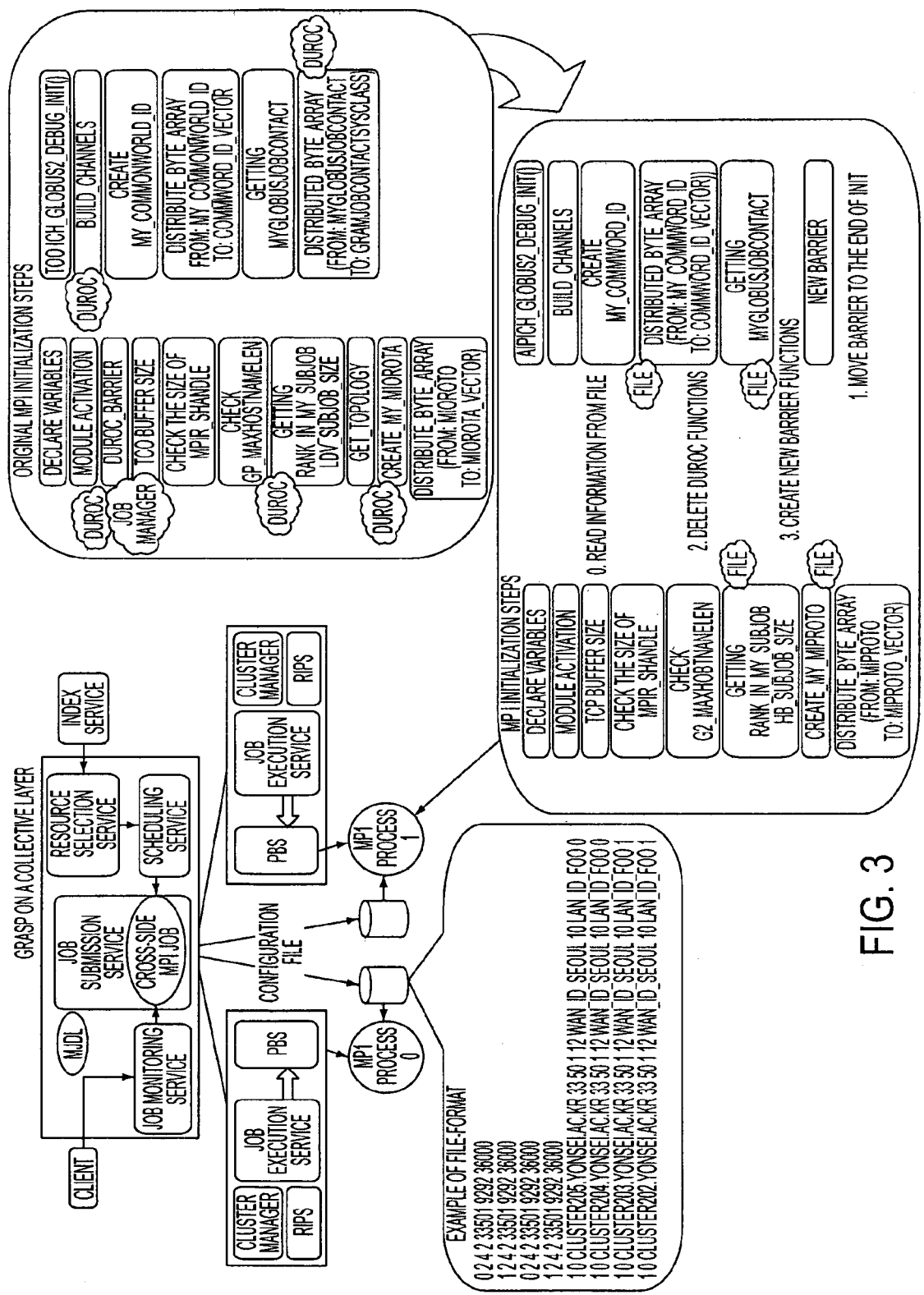
FIG. 3 is a schematic view of a file-based MPI initialization mechanism according to an embodiment of the present invention.

FIG. 3 is a schematic view of a file-based MPI initialization mechanism according to an embodiment of the present invention. Referring to FIG. 3, a configuration of an MPI job allocation system using a file-based MPI initialization includes a job submission service module located at the middleware of the entire grid computing system and job execution service modules located at nodes of the system.

The job submission service module generates a file containing an address, a port number, etc. of each node, which are necessary for the MPI initialization, and sends the file to the job execution service module of the corresponding node. Each job execution service module executes the MPI job, and the MPI program waits for the generation of the file and then performs initialization by using the information in the file.

The present invention clearly differentiates the jobs to be done by the MPI program and by the job submission service module in the middleware. Therefore, the present invention enables the MPI program to be executed in the grid computing system regardless of the design of the middleware.

FIG. 4 is a view of a file configuration, which shows an example of a file format to be provided for the MPI initialization in FIG. 3.

Referring to FIG. 4, the file format composes of two parts: one is related to topology construction of MPI ranks and the other describes information to build channel based on topology. It could be made RANK sequentially through first topology part. Once it had construction for each RANK, initialization process could be established to build channel through second part. Additionally, computational nodes which are configured to be implemented in the file-based grid MPI job allocation system might have private IP addresses. In such environment, user should specify the valid hostname of front node.

First part is as follows:
rank_in_my_subjob means rank in one's subjob.
my_subjob_size means size of one's subjob.
MPID_MyWorldSize means total size of MPI job.
nsujobs means number of subjob.
MPI process listen port means listening port of MPI process, which must be same value with the port of second part.
unique value for commworlld_id means id to construct COMMWORLD.
barrier_port means listening port for synchronization between processes in COMMWORLD.
hostname means hostname of computational node running each a MPI process.
front node's hostname means hostname of front node connected with computational node running each a MPI process, in case with environment to use private IP addresses. Otherwise, it means hostname of computational node running each a MPI process. For instance, while first line of FIG. 4 describes topology information which execution node is dccsaturn where front node is dccsun.sogang.ac.kr and has private IP address, third line of FIG. 3 shows information which computational node iscluster203.yonsei.ac.kr where has public IP address.

Second part is as follows:
s_nprotos means kinds of used protocol.
s_tcptype means types of used protocol: 0 is tap, 1 is mpi, and 2 is unknown. Currently, tcp type could be supported.
hostname manes means hostname of computational node running each a MPI process.
port means listening port of MPI process.
lan_id_lng means length of lan_id.
lan_id means identification that node is on the designated LAN.
localhost_id means identification that node is on the designated intra-machine area rather than LAN or WAN.
front node's hostname means hostname of front node connected with computational node running each a MPI process, in case with environment to use private IP addresses. Otherwise, it means hostname of computational node running each a MPI process.

Meanwhile, since jobs may be executed simultaneously and multiple times at each node, it is necessary to determine the filenames. That is, if a value for a filename is assigned to a shell environment parameter "FILENAME" when a job is submitted to the PBS, the filename can be understood from the shell environment parameter in MPI_Init. A corresponding number for job of each RANK is also transferred through a shell environment parameter "RANK".

Figure 5:
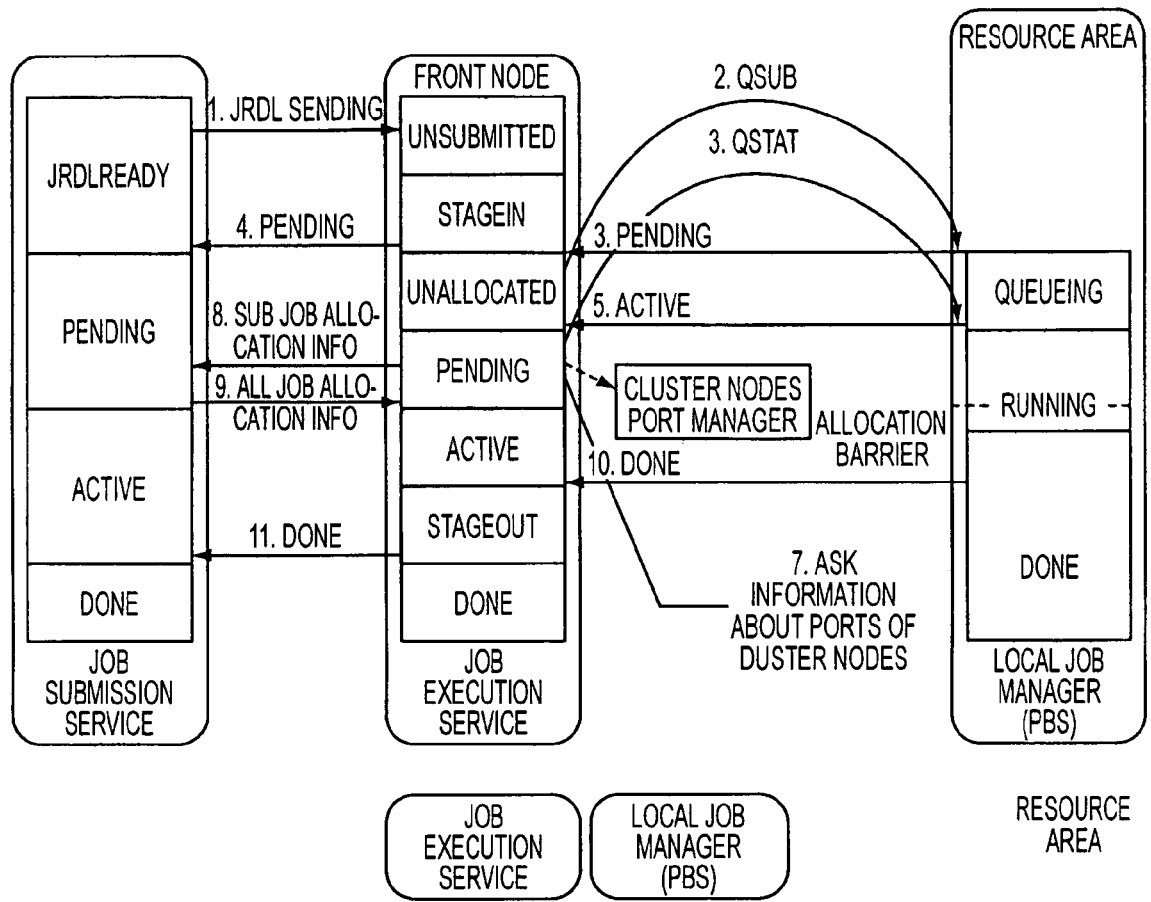
FIG. 5 is a flow diagram of a grid MPI job allocation using the file-based MPI initialization of FIG. 3 in an OGSA-based grid computing system.

FIG. 5 is a flow diagram of a grid MPI job allocation using the file-based MPI initialization of FIG. 3 in an OGSA-based grid computing system. Referring to FIG. 5, the job submission service module allocates job to each resource or node (resource area in FIG. 5). On an assumption that each resource or node includes a PBS job manager in a cluster environment, when the job submission service module has allocated job to each job execution service module, the job is executed in the PBS (arrow No. 2 in FIG. 5). When the job is executed in the PBS (i.e., in the running state), a specific address of each lower-layer node can be understood (arrow No. 6 in FIG. 5). Each MPI job waits for generation of the file. Each lower-layer node reports unassigned port numbers (from cluster nodes port manager in FIG. 5) and addresses to the job submission service module (arrow No. 8 in FIG. 5). In the case of the first RANK, the information reported to the job submission service module includes the unassigned port numbers. This is necessary for synchronization in order to report that the file has been completely read in the first RANK after the other RANKs read the information of the file. The job submission service generates the file (arrow No. 9 in FIG. 5) when addresses and port numbers of all RANK resources have been collected. When the file has been transmitted to each resource execution service module, the function of the job submission service module for the MPI initialization is completed. The initialization of the MPI program of each resource using the information of the transmitted file as described above enables execution of the MPI job of the multiple resources.

Table 1 shows comparison between the file-based MPI initialization of the present invention and the conventional MPICH-P4 and MPICH-G2 initializations according to reliability, management type, and information acquisition source.

TABLE 1

| | Reliability | Management type | Information acquisition source |
| --- | --- | --- | --- |
| MPICH-P4 | Low | Centralized type | User's Master process |
| MPICH-G2 | Very high | Centralized type | Central manager |
| File-based MPICH according to the invention | Very low | Distributed type | File |

As noted from Table 1, both the conventional MPICH-P4 and MPICH-G2 initializations are centralized types, in which the arbitration process is located at a central position and continuously performs the arbitrational function in the exchange of information between processes. Therefore, in the conventional MPICH-P4 and MPICH-G2 initializations, the location of the arbitration process has a large influence on the performance and the reliability on the middleware may become very large in some types of arbitration process. In contrast, the file-based initialization according to the present invention can execute the MPI only with a script capable of executing a process without relying on a specific software. The file-based initialization according to the present invention does not have a reliability on the middleware or other software.

As noted from the above description, a system and a method for grid MPI job allocation using the file-based MPI initialization according to the present invention have the following effects.

The file-based grid MPI job allocation system and method according to the present invention differentiate functions of the middleware and the MPI program from each other in the grid computing environment, thereby achieving MPI initialization without a separate arbitration process.

The present invention provide a system and a method for MPI job allocation using a file-based MPI initialization, which can easily execute the MPI job in any type of grid middleware.

Also, the present invention provides a system and a method for MPI job allocation, which can easily achieve MPI initialization for grid job even with a middleware configuration without a separate process participating in the MPI initialization, such as Globus toolkit 3.0.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A file-based grid Message Passing Interface (MPI) job allocation apparatus for a middleware-based grid computing apparatus in which computers having a plurality of computing resources including an MPI program are distributed and connected to each other through a network, comprising:

a plurality of computational nodes each having a job execution service module for executing a job for the plurality of computing resources including the MPI program included in the distributed computers; and a middleware having a job submission service module for distributing a job to the plurality of computational nodes, receiving information necessary for MPI initialization, generating a file including the information, and transmitting the file to the MPI program, wherein the grid MPI job allocation apparatus differentiates functions of the middleware and the MPI program, thereby achieving MPI initialization without intervention of a separate arbitration process.

2. The file-based grid MPI job allocation apparatus as claimed in claim 1, wherein the file transmitted from the middleware includes addresses and port numbers of the plurality of computational nodes.

3. A file-based grid Message Passing Interface (MPI) job allocation method in a middleware-based grid computing apparatus in which computers having a plurality of computing resources including an MPI program are distributed and connected to each other through a network, the file based grid MPI job allocation method comprising:

(1) transmitting information necessary for MPI initialization from a plurality of computational nodes that exist at intersections of lines connecting the plurality of computing resources to each other, to a job submission service module of a middleware;

(2) generating a file containing the information and transmitting the file to the plurality of computational nodes by the job submission service module;

(3) initializing the MPI program by using the information of the file; and (4) performing MPI job by the plurality of computing resources, wherein the grid MPI job allocation apparatus differentiates functions of the middleware and the MPI program, thereby achieving MPI initialization without intervention of a separate arbitration process.

4. The file-based MPI job allocation method as claimed in claim 3, wherein step (1) comprises:

distributing a job to the plurality of computational node s by the job submission service module;

executing a job manager by the plurality of computational nodes;

recognizing information necessary for MPI initialization, the information including specific addresses and port numbers of lower-layer computing resources, which are recognized by the execution of the job manager; and transmitting the recognized addresses to the job submission service module.

5. The file-based grid MPI job allocation method as claimed in claim 3, wherein step (2) comprises:

generating the file by formatting the information in a specific form by the job submission service module, the information being necessary for MPI initialization and being transmitted from the plurality of computational nodes; and transmitting the file formatted in the specific form to the plurality of computational nodes.

6. The file-based grid MPI job allocation method as claimed in claim 5, wherein the file is formatted in the specific form such that rank in one's subjob, size of one's subjob, total size of MPI job, number of subjobs, listening port of MPI process, kinds of used protocol, type of used protocol, hostname of a computational node running each MPI process, and identification of the designated LAN that the computational node is on can be recognized.

7. A computer readable medium comprising a plurality of instructions for a file-based grid Message Passing Interface (MPI) job allocation apparatus in a middleware-based grid computing apparatus in which computers having a plurality of computing resources including an MPI program are distributed and connected to each other through a network, which instructions when executed by a computer, causes the computer to perform:

(1) transmitting information necessary for MPI initialization from a plurality of computational nodes that exist at intersections of lines connecting the plurality of computing resources to each other, to a job submission service module of a middleware;

(2) generating a file containing the information and transmitting the file to the plurality of computational nodes by the job submission service module;

(3) initializing the MPI program by using the information of the file; and (4) performing MPI job by the plurality of computing resources, wherein the grid MPI job allocation apparatus differentiates functions of the middleware and the MPI program, thereby achieving MPI initialization without intervention of a separate arbitration process.

8. The computer readable medium as set forth in claim 7, wherein step (1) comprises:

distributing a job to the plurality of computational nodes by the job submission service module;

executing a job manager by the plurality of computational nodes;

recognizing information necessary for MPI initialization, the information including specific addresses and port numbers of lower-layer computing resources, which are recognized by the execution of the job manager; and transmitting the recognized addresses to the job submission service module.

9. The computer readable medium as set forth in claim 7, wherein step (2) comprises:

generating the file by formatting the information in a specific form by the job submission service module, the information being necessary for MPI initialization and being transmitted from the plurality of computational nodes; and transmitting the file formatted in the specific form to the plurality of computational nodes.

10. The computer readable medium as set forth in claim 9, wherein the file is formatted in the specific form such that rank in one's subjob, size of one's subjob, total size of MPI job, number of subjobs, listening port of MPI process, kind of used protocol, type of used protocol, hostname of a computational node running each MPI process, and identification of the designated LAN that the computational node is on can be recognized.

\* \* \* \* \*